United States Patent [19]

Mummenthey et al.

[11] 4,131,579

[45] Dec. 26, 1978

[54] LOW-VISCOSITY AIR-DRYING ALKYD RESINS

[75] Inventors: Hans-Dieter Mummenthey, Wiesbaden; Hannes Fischer, Taunusstein, both of Germany

[73] Assignee: Hoechst Aktiengesellschaft, Frankfurt am Main, Germany

[21] Appl. No.: 827,143

[22] Filed: Aug. 24, 1977

[30] Foreign Application Priority Data

Aug. 24, 1976 [DE] Fed. Rep. of Germany ....... 2637955

[51] Int. Cl.$^2$ ................................................. C09D 3/64
[52] U.S. Cl. ............................. 260/22 EP; 260/22 M; 428/480
[58] Field of Search ......................... 260/22 EP, 22 M; 428/480

[56] References Cited

U.S. PATENT DOCUMENTS

| 2,691,004 | 10/1954 | Doyle | 260/22 EP |
| 3,027,341 | 3/1962 | Boucher et al. | 260/22 EP |
| 3,196,119 | 7/1965 | Boller et al. | 260/22 EP |
| 3,268,483 | 8/1966 | Klootwijk et al. | 260/22 EP |
| 3,335,102 | 8/1967 | Bussell et al. | 260/22 EP |
| 3,374,208 | 3/1968 | Seiner et al. | 260/22EP |
| 3,650,997 | 3/1972 | Weisfeld et al. | 260/22 EP |

Primary Examiner—Ronald W. Griffin
Attorney, Agent, or Firm—Hammond & Littell

[57] ABSTRACT

An air-drying alkyd resin, based on A) a dicarboxylic acid; B) a non-drying monocarboxylic acid; C) a drying fatty acid; and D) at least one compound selected from the group consisting of D1) polyhydric, at least trihydric alcohol, and D2) mixtures of D1) with up to 20% by weight, based on the total weight of the alkyd resin, of at least one dihydric alcohol; modified by an additional reaction with at least one monofunctional monomeric oxirane compound and having a viscosity of not more than 450 mPa.s (measured in a 60% xylene solution at 20° C) and having an acid number of not more than 15, a process for its preparation and coated articles coated with compositions comprising said alkyd resin.

11 Claims, No Drawings

LOW-VISCOSITY AIR-DRYING ALKYD RESINS

This invention relates to low-viscosity air-drying alkyd resins based on unsaturated fatty acids suitable for use in the manufacture of surface coating compositions. Low-viscosity binding agents for air-drying coating compositions having a high solids content have been the subject of intensive work for a long time. In particular, it has been desired to reduce the impact on the environment from solvent vapours arising from the processing of coating compositions and to reduce as far as possible the costs of the solvents used in such compositions. These solvents are generally not recoverable.

To avoid the use of organic solvents in air-drying coating compositions it has been proposed to use synthetic resins capable of dilution in water or synthetic resin aqueous dispersions. Air-drying coating compositions capable of dilution in water have, however, compared with conventional solvent-based compositions, the disadvantage that the water contained in them may cause corrosion of substrates and also the release of the amines generally incorporated in them for neutralisation may cause an undesirable odour while the coating is hardening.

Synthetic resin aqueous dispersions can be manufactured with a relatively high solids content and generally without releasing substances harmful to the environment when they are used. However, the surface quality, primarily the gloss and flow characteristics of the coatings made from them, are inferior in many respects to conventional coating compositions containing organic solvents.

Polycondensation products containing hydroxyl and isocyanategroups have been proposed for air-drying coating compositions low in solvent. The processing of these products is, however, difficult due to the fast reaction rate between isocyanate and hydroxyl groups. Additionally, some of the isocyanate which evaporates from them when the coating is applied may represent a considerable physiological risk.

Especially low-viscosity alkyd resins modified with drying oils and/or fatty acids are also known as binding agents for coating compositions low in solvent and capable of crosslinking by oxidation. As the viscosity of these binding agents can be kept low only by a marked increase in the oil content of alternatively the inclusion of a large excess of polyhydric alcohols; they are unsuitable when fast drying is important because of the low hardening rate in the manufacture of industrial coatings.

Further coating compositions are known comprising a mixture of an epoxidised hardenable fatty acid ester and an unsaturated polyester having terminal carboxyl groups. The polyester, which has been manufactured by the reaction of polybasic carboxylic acids, which are at least partially unsaturated, with epoxy compounds such as cycloaliphatic epoxides or reaction products of epichlorohydrin with dihydric phenols or aliphatic polyhydric alcohols, is used as a cross-linking agent for the epoxidised fatty acid compounds. Partial preliminary cross-linking of the epoxy and polyester components is possible to increase the hardening or drying rate. Cross-linking can take place at room temperature or at elevated temperatures.

According to one aspect of the present invention there is provided an air-drying alkyd resin, based on A) a dicarboxylic acid; B) a non-drying monocarboxylic acid; C) a drying fatty acid; and D) at least one D1) polyhydric, at least trihydric, alcohol, or D2) mixtures of D1) with up to 20% by weight, based on the total weight of the alkyd resin, of at least one dihydric alcohol; modified by an additional reaction with at least one monofunctional monomeric oxirane compounds and having a viscosity of not more than 450 mPa.s (measured in a 60% xylene solution at 20° C.) and having an acid number of not more than 15. The viscosity of the alkyd resins of the present invention is preferably not more than 300, and advantageously not more than 200 mPa.s. The acid number is measured according to DIN 53,402 in the solid resin, and is preferably less than 13, advantageously not more than 10.

The alkyd resins according to the invention are capable of cross-linking by oxidation and, because of their favourable properties, are suitable for the manufacture of high-grade paints and other coating materials, especially industrial coating compositions. In comparison with similar products based on conventional commercial alkyd resins, coating compositions based on the resins of the present invention may have a solids content higher by 10–15% by weight, e.g. a total solids content of over 65, preferably over 70% by weight, and in contrast to the hitherto known low-viscosity air-drying alkyd resins, have surprisingly good drying properties similar to those of medium-oil alkyd resins of normal viscosity. Due to the higher solids content of coating compositions prepared using the resins of the invention, less solvent escapes into the atmosphere on drying, so that these compositions as well as having good properties, are environmentally more acceptable than previous compositions based on alkyd resins. Suitable polycarboxylic acids for use in the resins of the present invention are, for example, phthalic acid, isophthalic acid, terephthalic acid, trimellitic acid and mixtures thereof, and if desired, minor quantities of maleic acid and/or fumaric acid or the corresponding anhydrides (when they exist) may be additionally present. Other acids, such as, for example, succinic acid, glutaric acid, adipic acid and/or aliphatic dicarboxylic acids with longer carbon chains (for example, in the form of dimerised unsaturated fatty acids, e.g. dicarboxylic acids with up to 36 carbon atoms) may, if desired, be used in the resins. To achieve low viscosities in the resins, it is advantageous to use only minor quantities of acids with more than two COOH groups, desirably not more than 10, preferably not more than 5 mol %, in relation to the total polycarboxylic acids present.

It is convenient to use as the drying unsaturated fatty acid component, linoleic acid, which may be manufactured in technical purity from natural oils, for example, linseed oil, cotton seed oil, soya bean oil, sunflower oil, safflower oil and similar products; tall oil acid; fish oil fatty acid; conjugated linoleic acid and/or conjugated linolenic acid; and oils for example, the above-mentioned oils, fish oil and/or dehydrated castor oil. In addition, for partial blocking of the hydroxy groups of the polybasic alcohols, non-drying monocarboxylic acids, preferably benzoic acid, p-t-butylbenzoic acid and/or short-chain, optionally branched, aliphatic monocarboxylic acids with up to 12 carbon atoms, e.g. isononnoic acid, may be used. Their proportion preferably amounts to as much as 25, advantageously as much as 20, and most preferably as much as 15% by weight based on the total weight of the alkyd resins.

Trihydric alcohols and/or higher functionality alcohols especially tetrahydric alcohols, are generally preferred as the polyhydric alcohol component, such as glycerol, butan-1,2,4-triol, trimethylolethane, trimethylolpropane and pentaerythritol. In order to achieve a high drying rate, it is advantageous to use predominantly tetrahydric alcohols. To a minor extent, dihydric alcohols may be additionally used, such as, for example, ethanediol, propan-1,2-diol or propan-1,3-diol, butan-1,3-diol or butan-1,4-diol, pentanediols, hexanediols and/or octanediols. Their proportion can be, for example, up to 20, preferably 10, especially up to 5% by weight based on the total weight of the alkyd resin. To achieve a suffient drying rate and hardness, it is advantageous to choose a smaller proportion of diols when using longer chain alkylene compounds.

Preferred oxirane compounds for use in the resins of the invention are alkylene oxides, for example, ethylene oxide and propylene oxide, and/or glycidyl esters of saturated α-branched or unsaturated monocarboxylic acids preferably having up to 13, advantageously up to 10 carbon atoms, e.g. the glycidyl esters of a branched heptane carboxylic acid, acrylic or methacrylic acid. The oxirane compounds react with the surplus free carboxyl groups present. The fatty acid content of the alkyd resins according to the invention generally amounts to between 33 and 60, preferably between 40 and 55, and advantageously between 43 and 52% by weight, based on the solvent free product. Binding agents whose fatty acid content lies at the lower end of the specified range are distinguished by a particularly high drying rate, but are not fully soluble in aliphatic solvents, whereas resins whose fatty acid content tends to the upper limit specified show especially good drying properties. Without taking into account the oxirane compounds contained in the resin, the alkyd resins according to the invention preferably have the following mutual molar ratios of components A) to D):

I) component A) to component D), (0.8 to 1): 1, preferably (0.83 to 0.99):1, and advantageously (0.85 to 0.98):1, II) component C) to component B) (1.2 to 2.2):1, preferably (1.3 to 2.1):1, and advantageously (1.35 to 2):1; and III) the sum of components B) and C) to component D), (1.3 to 1.85):1, preferably (1.4 to 1.75):1, and advantageously (1.45 to 1.7):1.

The proportion of the monocarboxylic acid component B) in the sum of the carboxyl containing compounds may generally be from 13 to 25, preferably 14 to 23, advantageously 15 to 22.5 equivalent percent, based on the sum of the carboxyl groups. The proportion of component B) based on the total weight of the alkyd resin is preferably up to 25, advantageously 15% by weight as mentioned above.

The oxirane compounds necessary to react with the non-esterified carboxyl groups may be present in an amount of 4 to 16, preferably 5 to 15, most preferably 5.5 to 14 mol percent, calculated on the dicarboxylic acid component A). On the other hand, the proportion of oxirane compounds, based on the sum of carboxylic groups used, may desirably amount to from 1 to 8, preferably 1.3 to 7, and advantageously 1.5 to 6.5 equivalent percent. The proportion of oxiranes in the form of alkylene oxides, e.g. ethylene or propylene oxide, is generally 0.2 to 5, preferably 0.4 to 4, most preferably 0.5 to 3% by weight. Other oxirane compounds are generally added in a proportion of 1 to 10, preferably 2 to 8, at best 2.5 to 7% by weight calculated on the final alkyd resin containing the oxirane compound.

According to a preferred embodiment of the invention, alkyd resins with particularly good drying properties can be obtained, if at least a part of the fatty acid component of the alkyd resins according to the invention comprises one or more triple-conjugated unsaturated fatty acids. It is surprising that the triple-conjugated unsaturated fatty acids, such as, for example, eleostearic acid, licanic acid or isomerised linolenic acid, produce a considerable increase in drying rate without a rise in the viscosity of the binding agent above the required maximum level. Triple-conjugated unsaturated fatty acids, for example eleostearic acid and/or licanic acid, are generally used in the form of natural oils, preferably wood oil and/or oiticica oil. If these oils are used in the present invention instead of the free fatty acids it is advantageous to make an equivalent reduction in the proportion of polyhydric alcohols contained in the basic alkyd resins, by the amount of glycerol yielded by the oil. Wood oil and oiticica oil may be incorporated in the alkyd resins according to the invention, for example, in such concentrations that the proportion of triple-conjugated unsaturated fatty acids in the entire fatty acid components is desirably at least 5, preferably at least 10, mol percent, and desirably at most 33, preferably not more than 25, most preferably not more than 20 mol %. In the manufacture of alkyd resins containing triple-conjugated unsaturated fatty acids, it is advantageous to react the ester radicals of wood oil and/or oiticica oil with the polyol in a first step. According to a further aspect of the present invention there is provided a process for the preparation of the alkyd resins according to the invention which comprises condensing components A) to D) in a conventional way such that the condensation is discontinued when the viscosity of the condensation product is not more than 360, preferably not more than 240 mPa.s (60% xylene/20° C.), and the acid number thereof is from 5 to 30, preferably from 12 to 25 and subsequently reacting the condensation product with at least one monofunctional monomeric oxirane compound whereby the viscosity of the compounds obtained, compared with the reaction products from components A) to D), is not or only slightly increased. The alkyd resins can generally be manufactured in known manner by heating to over 180° C., preferably over 200° C., in the presence of a gas which remains inert under the reaction conditions preferably with azeotropic distillation of water formed by esterification in the presence of an entrainer, e.g. xylene. If natural oils are used, it is advantageous to react them, before addition of polycarboxylic acid, with polyhydric alcohols, to form partial esters. If oils are used which contain triple-conjugated unsaturated fatty acids, the reaction temperatures and times necessary for reaction of the ester groups are advantageously kept as low as possible, e.g. not over 250° C., in order to avoid any undesirable increases in viscosity. Preferably, the reaction time at the maximum temperature is not more than two hours.

The reaction of excess carboxyl groups with oxirane compounds is generally carried out at temperatures below 200° C., preferably not over 180° C., optionally under pressure, and is almost entirely finished within one hour.

According to a yet further aspect of the present invention there are provided coating compositions comprising an alkyd resin according to the invention together with an organic solvent.

The coating compositions according to the invention may optionally contain pigments and/or other conventional paint additives such as, for example, driers. The solids content of the coating compositions according to the invention is preferably greater than 65%, advantageously greater than 70%, by weight.

Articles may be coated with the compositions according to the invention by conventional techniques and such articles form a still further aspect of the invention.

In the following Examples T represents parts by weight and all percentages are percentages by weight. Unless otherwise stated the viscosities were determined at 20° C. in a 60% xylene solution. The acid number and hydroxyl number were calculated for the solid resins.

EXAMPLE 1

47T of soya bean oil fatty acid, 11.5T of benzoic acid, 22.5T of phthalic anhydride, 21T of technical pentaerythritol and 0.1T of triphenyl phosphite as catalyst, are reacted after the addition of 5T of xylene, with continuous separation of the water formed during esterification, until a product with an acid number of 20 is produced. After cooling to 180° C., 3.9T of the glycidyl ester of a 1,1'-disubstituted branched decane monocarboxylic acid are added. The reaction mixture is maintained at this temperature for one hour. The product has the following characteristics: viscosity 143 mPa.s; acid number, calculated on a solid resin, 8 (DIN 53402); hydroxyl number, calculated on solid resin, 49 (DIN 53240).

EXAMPLE 2

By the method described in Example 1 an alkyd resin is prepared from 47T of tall oil fatty acid free of hard resin, 11T of benzoic acid, 22T of phthalic anhydride, 20T of technical pentaerythritol, 1.7T of trimethylolpropane, 0.1T of triphenyl phosphite as catalyst, and 3.8T of the fatty acid glycidyl ester described in Example 1. The final product has the following characteristics: viscosity 132 mPa.s; acid number 10; hydroxyl number 53.

EXAMPLE 3

By the method described in Example 1 an alkyd resin is prepared from 46T soya bean oil fatty acid, 5.5T benzoic acid, 8T p-t-butylbenzoic acid, 20T of technical pentaerythritol, 0.1T of triphenyl phosphite as catalyst, 21T of phthalic anhydride and 4.5T of the fatty acid glycidyl ester described in Example 1. The final product has the following characteristics: viscosity 118 mPa.s; acid number 11; hydroxyl number 51.

EXAMPLE 4

By the method described in Example 1, an alkyd resin is prepared from 32T of soya bean oil fatty acid, 16T of conjugated linoleic acid, 12T of benzoic acid, 23T of phthalic anhydride, 21T of technical pentaerythritol, 2T of trimethylolpropane, 0.1T of triphenyl phosphite as catalyst and 4.1T of the fatty acid glycidyl ester described in Example 1. The final product has the following characteristics: viscosity 122 mPa.s; acid number 11; hydroxyl number 56.

EXAMPLE 5

1300T of soya bean oil fatty acid, 250T of wood oil and 500T of p-t-butylbenzoic acid are heated with 700T of technical pentaerythritol to 250° C. with azeotropic distillation of the water formed, until a product with an acid number of 5 is produced. After the addition of 770T of phthalic anhydride, polycondensation is continued at 230° C. with azeotropic distillation with xylene of the water released during esterification, until a product with an acid number of less than 20 is produced. The acid number is then lowered to below 10 by the addition of 200T of the glycidyl ester of a branched heptane carboxylic acid.

The alkyd resin obtained has a viscosity of 195 mPa.s.

EXAMPLE 6

660T of tall oil fatty acid free of hard resin, 170T of oiticica oil, 350T of technical pentaerythritol, 230T of p-t-butylbenzoic acid, 0.8T of triphenyl phosphite as catalyst, 390T of phthalic anhydride and 100T of the glycidyl ester of a branched heptane carboxylic acid, are reacted to form an alkyd resin analogously to Example 5. The product has the following characteristics: viscosity 200 mPa.s; acid number 6.

Comparison Example 43.5T of soya bean oil fatty acid, 12T of benzoic acid, 20T of phthalic anhydride, 24T of technical pentaerythritol and 0.1T of triphenyl phosphite as catalyst were condensed after the addition of 5T of xylene, with azeotropic distillation of the water formed during esterification, until a product with an acid number of 10 was produced; viscosity 160 mPa.s. From the alkyd resins made according to Examples 1 to 6 and the Comparison Example, white-pigmented air-drying industrial paints were prepared according to the following recipe. 125T of an 80% alkyd resin solution in xylene, 70T of titanium dioxide, 2.5T of calcium octoate (4%) and 4T of bentonite (10%) in white spirit were stirred with 30T of xylene and ground in a ball mill. To the mill base thus obtained was then added 0.7T of cobalt octoate (6%), 0.86T of lead octoate (24%), 1.5T of an oxidation inhibitor (55%) and 1.67T of zirconium octoate (6%). After homogenisation of the mixture by stirring, the coating composition was adjusted to a viscosity of 90 sec. (DIN beaker, nozzle 4 mm) by the addition of xylene.

The results of application tests to the coatings obtained with the above compositions are set out in the following Table.

Table

| Example | 1 | 2 | 3 | 4 | 5 | 6 | Comparison |
|---|---|---|---|---|---|---|---|
| Solids content of the paint (% by weight) | 75 | 74.2 | 74.8 | 76.2 | 77 | 73 | 74 |
| Film thickness (microns) (wet film) | 200 | 200 | 200 | 200 | 200 | 200 | 200 |
| Drying time (hours) | 3.5 | 3.25 | 3.25 | 4.5 | 2.2 | 2.2 | >8 |
| Complete drying after 24 hours (1) | 2–3 | 3 | 3 | 2–3 | 1.5–2 | 1.5–2 | 5 |
| gloss (%) (2) | 106 | 108 | 112 | 112 | 103 | 120 | — |
| Pendulum hardness in seconds (3) | 8 | 7 | 7 | 7 | 24 | 25 | — |

1). Evaluation according to DIN 53230 ; 0 = best value, 5 = worst value.
2). According to DIN 67530
3). According to DIN 53157

As the Table shows, the coatings obtained based on alkyd resins according to Examples 1 to 6 are substantially superior to those based on the resin of the Composition Example as regards the drying rate. The gloss and the pendulum hardness of the coating based on the resin of the Comparison Example could not be determined, as it was still tacky after more than eight hours. The values for the coatings based on the resins of Examples 5 and 6 show considerably faster drying with an equally high solids content. The high solids content of the composition results, apart from the saving of organic solvent, in the advantage that the coating applied has a higher concentration of binding agent, together with good workability due to the low viscosity of the resins, so that for a desired surface protection of a required thickness fewer operations than hitherto are necessary to apply the coating.

We claim:

1. An air-drying alkyd resin, based on A) a dicarboxylic acid; B) a non-drying monocarboxylic acid; C) a drying fatty acid; and D) at least one compound selected from the group consisting of D1) polyhydric, at least trihydric alcohol, and D2) mixtures of D1) with up to 20% by weight, based on the total weight of the alkyd resin, of at least one dihydric alcohol; modified by an additional reaction with at least one monofunctional monomeric oxirane compound and having a viscosity of not more than 450 mPa.s (measured in a 60% xylene solution at 20° C.) and having an acid number of not more than 15.

2. An alkyd resin as claimed in claim 1 wherein the molar ratio of component A) to component D) is (from 0.8 to 1) : 1; the molar ratio of component C) to component B) is (from 1.2 to 2.2) : 1; and the molar ratio of the sum of components B) and C) to component D) is (from 1.3 to 1.85) : 1.

3. An alkyd resin as claimed in claim 1 wherein the proportion of oxirane compounds is from 1 to 8 equivalent percent, based on the sum of the carboxyl groups used.

4. An alkyd resin as claimed in claim 1 wherein the oxirane compound comprises a compound selected from the group consisting of alkylene oxide, glycidyl ester of a saturated, branched, unsaturated monocarboxylic acid and a mixture thereof.

5. An alkyd resin as claimed in claim 1 wherein the proportion of component B) in the alkyd resin is up to 25% by weight, based on the total weight of the alkyd resin and in the sum of the carboxyl containing compounds, is from 13 to 25 equivalent percent, based on the sum of the carboxyl groups.

6. An alkyd resin as claimed in claim 1 wherein the proportion of any polycarboxylic acid components containing more than two carboxyl groups is not more than 10 mol percent based on the total polycarboxylic acids present.

7. An alkyd resin as claimed in claim 1 wherein component C) comprises a fatty acid mixture comprising 5 to 33 mol percent based on the total fatty acids of triple-conjugated unsaturated fatty acids.

8. A process for the preparation of an air-drying alkyd resin which comprises condensing A) a dicarboxylic acid; B) a non-drying monocarboxylic acid; C) a drying fatty acid; and D) at least one compound selected from the group consisting of D1) polyhydric, at least trihydric, alcohol, and D2) mixtures of D1) with up to 20% by weight, based on the total weight of the alkyd resin, of at least one dihydric alcohol; discontinuing the condensation reaction when the viscosity of the condensation product is not more than 360 mPa.s (measured in a 60% xylene solution at 20° C.) and the acid number thereof is from 5 to 30; and subsequently reacting the condensation product thus obtained with at least one monofunctional monomeric oxirane compound.

9. A process as claimed in claim 8 wherein the condensation reaction is effected with azeotropic distillation of water formed by esterification in the presence of an entrainer at a temperature greater than 180° C. in the presence of a gas which remains inert under the reaction conditions and subsequently followed by the reaction of the condensation product with the oxirane compound at a temperature below 200° C.

10. An organic solvent containing coating composition comprising as a binder an alkyd resin as claimed in claim 1.

11. An article coated with a coating composition as claimed in claim 10.

* * * * *